US009245564B2

(12) United States Patent
Arnoldussen et al.

(10) Patent No.: US 9,245,564 B2
(45) Date of Patent: Jan. 26, 2016

(54) SOFT UNDERLAYER HAVING A MULTILAYER STRUCTURE FOR HIGH AREAL DENSITY PERPENDICULAR RECORDING MEDIA

(71) Applicant: HGST Netherlands B.V., Amsterdam (NL)

(72) Inventors: Thomas C. Arnoldussen, Los Altos, CA (US); Jack Jyh-Kau Chang, Fremont, CA (US); Arien M. Ghaderi, Morgan Hill, CA (US); Zhupei Shi, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/265,161

(22) Filed: Apr. 29, 2014

(65) Prior Publication Data

US 2015/0310884 A1 Oct. 29, 2015

(51) Int. Cl.

| | |
|---|---|
| ***G11B 5/82*** | (2006.01) |
| ***G11B 5/667*** | (2006.01) |
| ***G11B 5/65*** | (2006.01) |

(52) U.S. Cl.
CPC . *G11B 5/667* (2013.01); *G11B 5/65* (2013.01)

(58) Field of Classification Search
CPC ............ G11B 5/667; G11B 5/66; G11B 5/65; G11B 5/656; G11B 5/82; G11B 5/653
USPC ........................ 360/135; 428/827, 828.1, 829
See application file for complete search history.

(56) References Cited

U.S. PATENT DOCUMENTS

| | | | | |
|---|---|---|---|---|
| 6,777,066 | B1 | 8/2004 | Chang et al. | |
| 6,777,113 | B2 * | 8/2004 | Trindade et al. | 428/829 |
| 6,818,330 | B2 * | 11/2004 | Shukh et al. | 428/828 |
| 7,041,393 | B2 | 5/2006 | Tanahashi et al. | |
| 7,449,255 | B2 | 11/2008 | Kubota et al. | |
| 7,651,795 | B2 | 1/2010 | Tamai et al. | |
| 7,666,529 | B2 * | 2/2010 | Girt et al. | 428/828.1 |
| 7,901,802 | B2 * | 3/2011 | Zhou et al. | 428/828.1 |
| 7,993,765 | B2 | 8/2011 | Kim et al. | |
| 8,277,962 | B2 * | 10/2012 | Zhou et al. | 428/828.1 |
| 8,338,005 | B2 * | 12/2012 | Gao et al. | 428/827 |
| 2002/0028357 | A1 * | 3/2002 | Shukh et al. | 428/694 TM |
| 2007/0111035 | A1 * | 5/2007 | Shimizu et al. | 428/828.1 |
| 2011/0043939 | A1 * | 2/2011 | Nolan et al. | 360/55 |
| 2012/0052330 | A1 | 3/2012 | Takekuma et al. | |
| 2012/0127609 | A1 * | 5/2012 | Chang et al. | 360/110 |
| 2012/0219827 | A1 | 8/2012 | Kim et al. | |
| 2014/0168817 | A1 * | 6/2014 | Choe | G11B 5/62 360/234.3 |

OTHER PUBLICATIONS

Zheng et al., "SNR Improvement of Granular Perpendicular Recording Media," IEEE Transactions on Magnetics, vol. 39, Issue 4, Jul. 2003, pp. 1919-1924, Abstract Only.
Zheng et al., "Seedlayer and Pre-Heatfng Effects on Crystallography and Recording Performance of CoCrPtB Perpendicular Media," 2002 IEEE International Magnetics Conference, Digest of Technical Papers INTERMAG Europe 2002, Apr. 28-May 2, 2002, pp. 402, Abstract Only.

* cited by examiner

*Primary Examiner* — Will J Klimowicz
(74) *Attorney, Agent, or Firm* — Zilka-Kotab, PC

(57) ABSTRACT

According to one embodiment, a soft underlayer structure includes a coupling layer, at least one outer soft underlayer positioned above and below the coupling layer, and at least one inner soft underlayer positioned above and below the coupling layer between the coupling layer and the associated outer soft underlayer, where the inner soft underlayers have a saturation magnetic flux density and/or a thickness that is different than a saturation magnetic flux density and/or a thickness of the outer soft underlayers.

19 Claims, 10 Drawing Sheets

SOFT UNDERLAYER HAVING A MULTILAYER STRUCTURE FOR HIGH AREAL DENSITY PERPENDICULAR RECORDING MEDIA

FIELD OF THE INVENTION

The present invention relates to data storage systems, and more particularly, this invention relates to a soft underlayer for use in magnetic recording media.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. Accordingly, an important and ongoing goal involves increasing the amount of information able to be stored in the limited area and volume of HDDs. Increasing the areal recording density of HDDs provides one technical approach to achieve this goal. In particular, reducing the size of recording bits and components associated therewith offers an effective means to increase areal recording density. However, the continual push to miniaturize the recording bits and associated components presents its own set of challenges and obstacles.

SUMMARY

According to one embodiment, a soft underlayer structure includes a coupling layer, at least one outer soft underlayer positioned above and below the coupling layer, and at least one inner soft underlayer positioned above and below the coupling layer between the coupling layer and the associated outer soft underlayer, where the inner soft underlayers have a saturation magnetic flux density and/or a thickness that is different than a saturation magnetic flux density and/or a thickness of the outer soft underlayers.

According to another embodiment, a product includes a soft underlayer structure, and a recording layer above the soft underlayer structure. The soft underlayer structure includes a coupling layer, at least one outer soft underlayer positioned above and below the coupling layer, and at least one inner soft underlayer positioned above and below the coupling layer between the coupling layer and the associated outer soft underlayer, where the inner soft underlayers have a saturation magnetic flux density and/or a thickness that is different than a saturation magnetic flux density and/or a thickness of the outer soft underlayers.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a soft underlayer structure includes a coupling layer, at least one outer soft underlayer positioned above and below the coupling layer, and at least one inner soft underlayer positioned above and below the coupling layer between the coupling layer and the associated outer soft underlayer, where the inner soft underlayers have a saturation magnetic flux density and/or a thickness that is different than a saturation magnetic flux density and/or a thickness of the outer soft underlayers.

In another general embodiment, a product includes a soft underlayer structure, and a recording layer above the soft underlayer structure. The soft underlayer structure includes a coupling layer, at least one outer soft underlayer positioned above and below the coupling layer, and at least one inner soft underlayer positioned above and below the coupling layer between the coupling layer and the associated outer soft underlayer, where the inner soft underlayers have a saturation magnetic flux density and/or a thickness that is different than a saturation magnetic flux density and/or a thickness of the outer soft underlayers.

Figure 1:
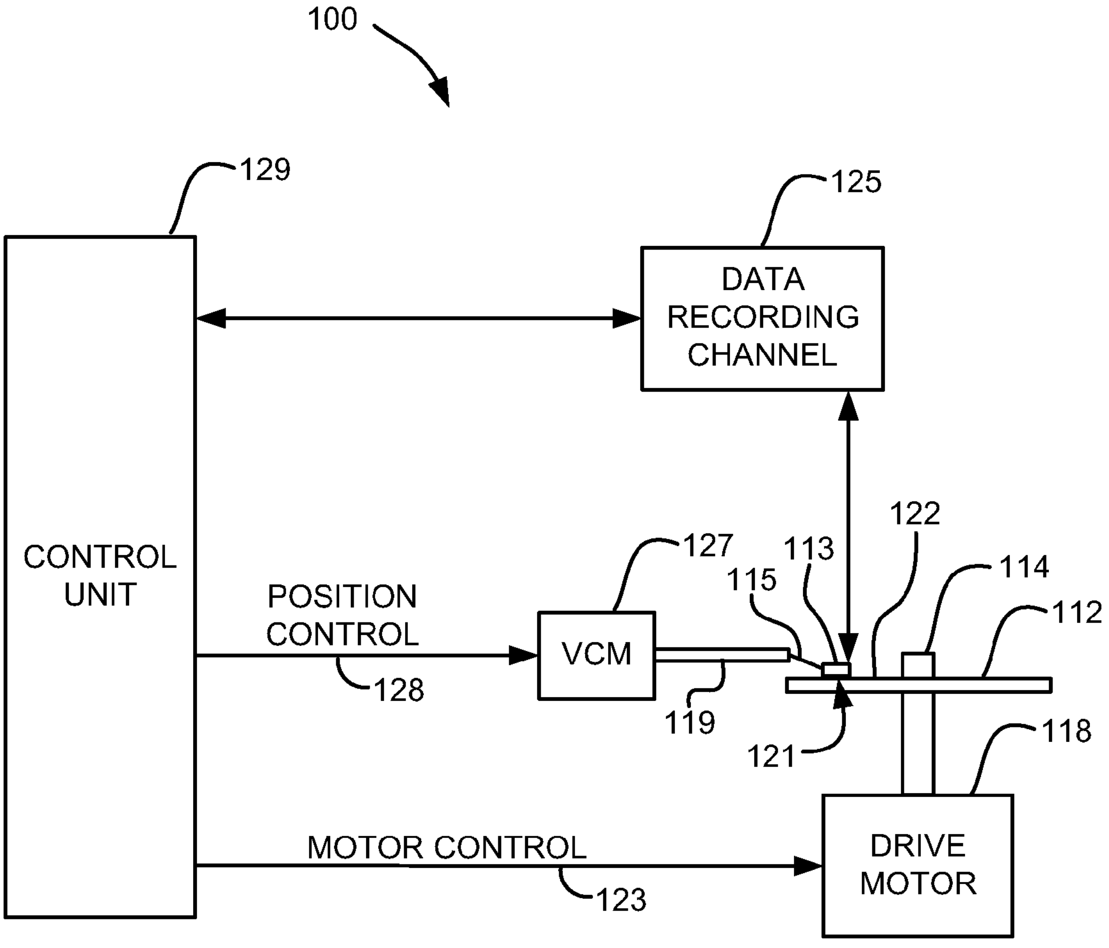
FIG. 1 is a simplified drawing of a magnetic recording disk drive system, according to one embodiment.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figures 2A, 2B, 3A, 3B:
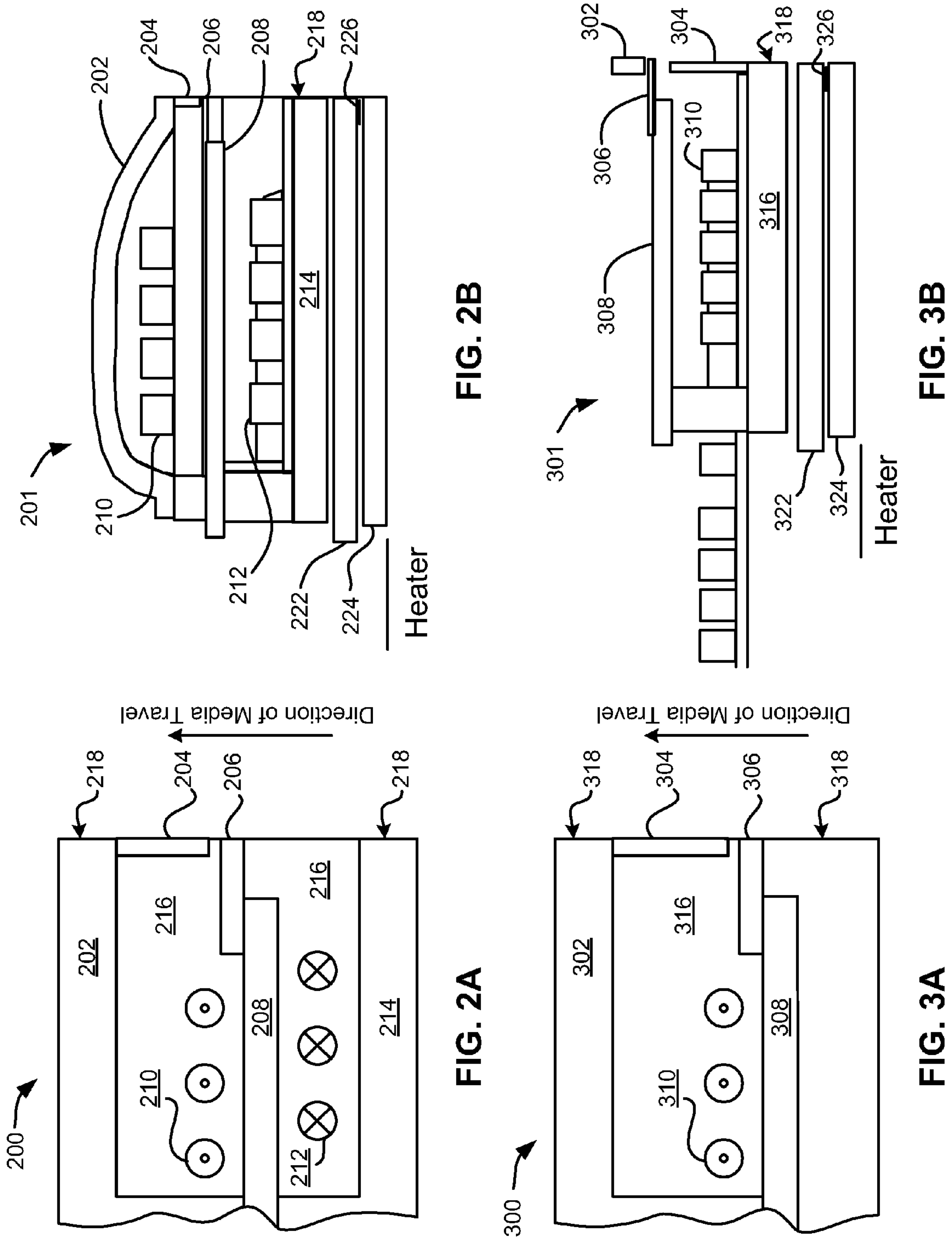
FIG. 2A is a cross-sectional view of a perpendicular magnetic head with helical coils, according to one embodiment.
FIG. 2B is a cross-sectional view a piggyback magnetic head with helical coils, according to one embodiment.
FIG. 3A is a cross-sectional view of a perpendicular magnetic head with looped coils, according to one embodiment.
FIG. 3B is a cross-sectional view of a piggyback magnetic head with looped coils, according to one embodiment.

FIG. 2A is a cross-sectional view of a perpendicular magnetic head 200, according to one embodiment. In FIG. 2A, helical coils 210 and 212 are used to create magnetic flux in the stitch pole 208, which then delivers that flux to the main pole 206. Coils 210 indicate coils extending out from the page, while coils 212 indicate coils extending into the page. Stitch pole 208 may be recessed from the ABS 218. Insulation 216 surrounds the coils and may provide support for some of the elements. The direction of the media travel, as indicated by the arrow to the right of the structure, moves the media past the lower return pole 214 first, then past the stitch pole 208, main pole 206, trailing shield 204 which may be connected to the wrap around shield (not shown), and finally past the upper return pole 202. Each of these components may have a portion in contact with the ABS 218. The ABS 218 is indicated across the right side of the structure.

Perpendicular writing is achieved by forcing flux through the stitch pole 208 into the main pole 206 and then to the surface of the disk positioned towards the ABS 218.

FIG. 2B illustrates one embodiment of a piggyback magnetic head 201 having similar features to the head 200 of FIG. 2A. As shown in FIG. 2B, two shields 204, 214 flank the stitch pole 208 and main pole 206. Also sensor shields 222, 224 are shown. The sensor 226 is typically positioned between the sensor shields 222, 224.

FIG. 3A is a schematic diagram of another embodiment of a perpendicular magnetic head 300, which uses looped coils 310 to provide flux to the stitch pole 308, a configuration that is sometimes referred to as a pancake configuration. The stitch pole 308 provides the flux to the main pole 306. With this arrangement, the lower return pole may be optional. Insulation 316 surrounds the coils 310, and may provide support for the stitch pole 308 and main pole 306. The stitch pole may be recessed from the ABS 318. The direction of the media travel, as indicated by the arrow to the right of the structure, moves the media past the stitch pole 308, main pole 306, trailing shield 304 which may be connected to the wrap around shield (not shown), and finally past the upper return pole 302 (all of which may or may not have a portion in contact with the ABS 318). The ABS 318 is indicated across the right side of the structure. The trailing shield 304 may be in contact with the main pole 306 in some embodiments.

FIG. 3B illustrates another embodiment of a piggyback magnetic head 301 having similar features to the head 300 of FIG. 3A. As shown in FIG. 3B, the piggyback magnetic head 301 also includes a looped coil 310, which wraps around to form a pancake coil. Sensor shields 322, 324 are additionally shown. The sensor 326 is typically positioned between the sensor shields 322, 324.

In FIGS. 2B and 3B, an optional heater is shown near the non-ABS side of the magnetic head. A heater (Heater) may also be included in the magnetic heads shown in FIGS. 2A and 3A. The position of this heater may vary based on design parameters such as where the protrusion is desired, coefficients of thermal expansion of the surrounding layers, etc.

Except as otherwise described herein, the various components of the structures of FIGS. 2A-3B may comprise suitable materials, arrangements and/or design, as would be understood by one skilled in the art upon reading the present disclosure.

Figure 4A:
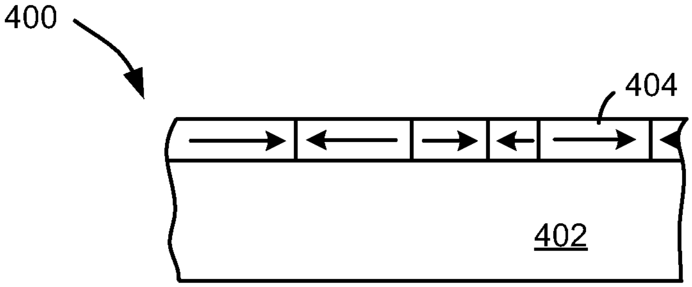
FIG. 4A is a schematic representation of a section of a longitudinal recording medium, according to one embodiment.

FIG. 4A provides a schematic illustration of a longitudinal recording medium 400 typically used with magnetic disc recording systems, such as that shown in FIG. 1. This longitudinal recording medium 400 is utilized for recording magnetic impulses in (or parallel to) the plane of the medium itself. This longitudinal recording medium 400, which may be a recording disc in various approaches, comprises at least a supporting substrate 402 of a suitable non-magnetic material such as glass, and a conventional magnetic recording layer 404 positioned above the substrate.

Figure 4B:
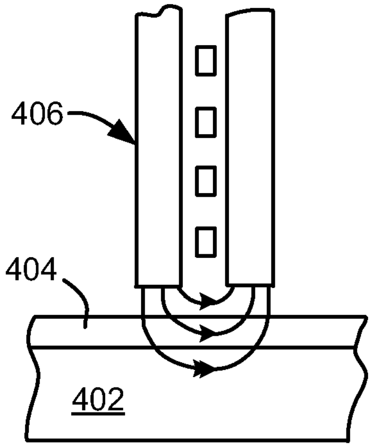
FIG. 4B is a schematic representation of a magnetic recording head and the longitudinal recording medium of FIG. 4A, according to one embodiment.

FIG. 4B shows the operative relationship between a recording/playback head 406, which may preferably be a thin film head and/or other suitable head as would be recognized by one having skill in the art upon reading the present disclosure, and the longitudinal recording medium 400 of FIG. 4A.

Improvements in longitudinal recording media have been limited due to issues associated with thermal stability and recording field strength. Accordingly, pursuant to the current push to increase the areal recording density of recording media, perpendicular recording media (PMR) has been developed and found to be superior to longitudinal recording media. FIG. 5A provides a schematic diagram of a perpendicular recording medium 500, which may also be used with magnetic disc recording systems, such as that shown in FIG. 1. As shown in FIG. 5A, the perpendicular recording medium 500, which may be a recording disc in various approaches, comprises at least a supporting substrate 502 of a suitable non-magnetic material (e.g., glass), and a soft underlayer 504 of a material having a high magnetic permeability positioned above the substrate 502. The perpendicular recording medium 500 also includes a conventional magnetic recording layer 506 positioned above the soft underlayer 504, where the magnetic recording layer 506 preferably has a high coercivity relative to the soft underlayer 504. There may be an additional layer called an "exchange-break" layer or "interlayer" (not shown) between the soft underlayer 504 and the magnetic recording layer 506.

The orientation of magnetic impulses in the magnetic recording layer 506 is substantially perpendicular to the surface of the recording layer. The magnetization of the soft underlayer 504 is oriented in (or parallel to) the plane of the soft underlayer 504. As particularly shown in FIG. 5A, the in-plane magnetization of the soft underlayer 504 may be represented by an arrow extending into the paper.

Figure 5C:
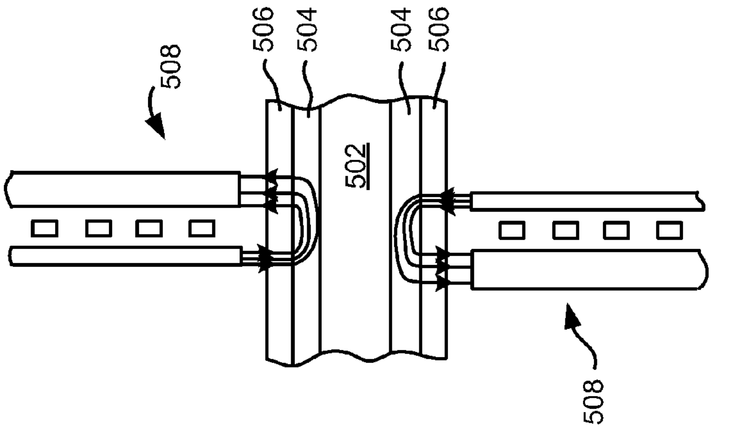
FIG. 5C is a schematic representation of a recording apparatus configured to record separately on both sides of a perpendicular recording medium, according to one embodiment.
Figure 5A:
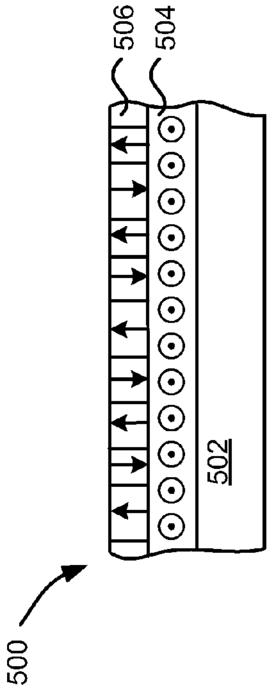
FIG. 5A is a schematic representation of a perpendicular recording medium, according to one embodiment.
Figure 5B:
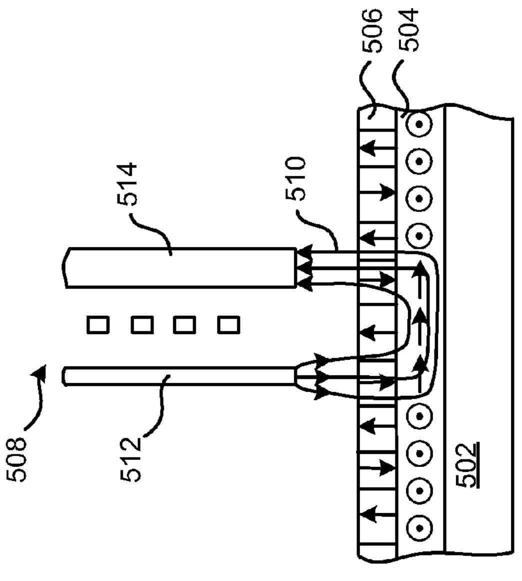
FIG. 5B is a schematic representation of a recording head and the perpendicular recording medium of FIG. 5A, according to one embodiment.

FIG. 5B illustrates the operative relationship between a perpendicular head 508 and the perpendicular recording medium 500 of in FIG. 5A. As shown in FIG. 5A, the magnetic flux 510, which extends between the main pole 512 and return pole 514 of the perpendicular head 508, loops into and out of the magnetic recording layer 506 and soft underlayer 504. The soft underlayer 504 helps focus the magnetic flux 510 from the perpendicular head 508 into the magnetic recording layer 506 in a direction generally perpendicular to the surface of the magnetic medium. Accordingly, the intense magnetic field generated between the perpendicular head 508 and the soft underlayer 504, enables information to be recorded in the magnetic recording layer 506. The magnet flux is further channeled by the soft underlayer 504 back to the return pole 514 of the head 508.

As noted above, the magnetization of the soft underlayer 504 is oriented in (or parallel to) the plane of the soft underlayer 504, and may represented by an arrow extending into the paper. However, as shown in FIG. 5B, this in plane magnetization of the soft underlayer 504 may rotate in regions that are exposed to the magnetic flux 510.

FIG. 5C illustrates one embodiment of the structure shown in FIG. 5B, where soft underlayers 504 and magnetic recording layers 506 are positioned on opposite sides of the substrate 502, along with suitable recording heads 508 positioned adjacent the outer surface of the magnetic recording layers 506, thereby allowing recording on each side of the medium.

Again, except as otherwise described herein, the various components of the structures of FIGS. 4A-5B may comprise suitable materials, arrangements and/or design, as would be understood by one skilled in the art upon reading the present disclosure.

As discussed previously, efforts are continually made to increase the areal recording density of magnetic media. Areal density, e.g., as measured in bits per square inch, may be defined as the product of the track density (the tracks per inch radially on the magnetic medium, such as a disk) and the linear density (the bits per inch along each track). For a disk, the bits are written closely-spaced to form circular tracks on the disk surface, where each of the bits may comprise an ensemble of magnetic grains.

An important factor relevant to track density is the magnetic core width. The magnetic core width determines the width of a magnetic bit recorded by the write/main pole of the write head. Thus, the smaller the magnetic core width, the greater the number of tracks of data that can be written to the media. Stated another way, high track density is associated with a narrow magnetic core width.

Moreover, an important factor relevant to linear density is the signal to noise ratio (SNR). Typically, a higher signal to noise ratio corresponds to a higher readable linear density. One approach to increase the signal to noise ratio involves reducing the size of the magnetic grains. However, the reduction in magnetic grain size is constrained by the superparamagnetic limit. Namely, as the magnetic grains get smaller, they are more susceptible to changes in their magnetization due to thermal fluctuations in the media, leading to the undesirable loss of recorded data. While the coercivity, $H_c$, of the magnetic grains may be increased to mitigate this thermal instability, such an increase may nevertheless require an increase in the magnetic field required to change the magnetic orientation of the grains during the data recording process.

The use of perpendicular recording (PMR) media addresses this thermal limit and allows continued advances in areal density. As noted previously, PMR media typically includes a soft magnetic underlayer configured to focus magnetic flux into the magnetic recording layer. However, with current PMR media design, there are tradeoffs between the magnetic core width and the signal to noise ratio. In general, improving the signal to noise ratio results in an increase in the magnetic core width. Likewise, narrowing the magnetic core width results in a degradation of the signal to noise ratio.

Figures 6A, 6B, 6C:
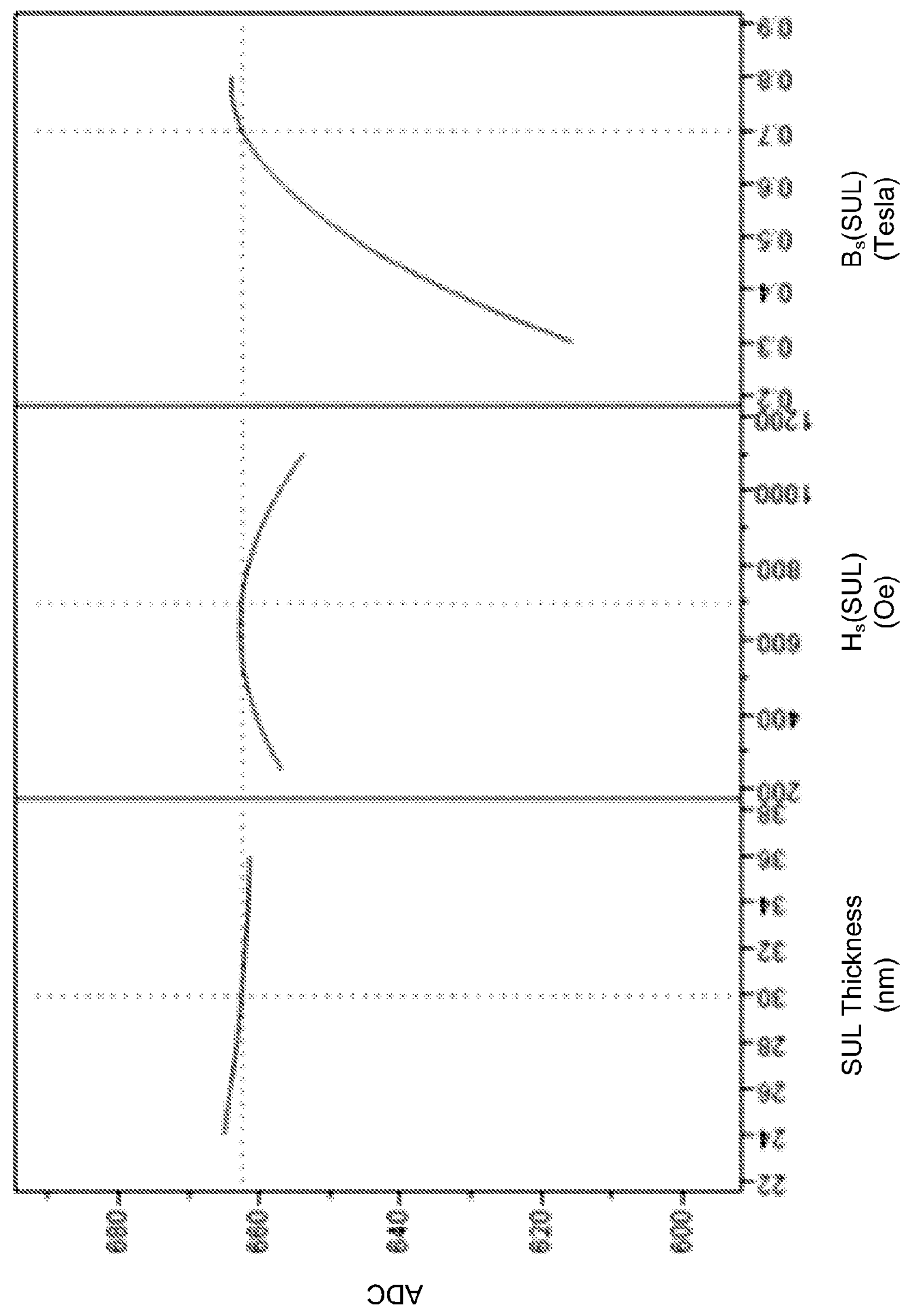
FIGS. 6A-6C illustrate a calculation, based on a Micromagnetic Model, of areal density capacity (ADC) as a function of various soft underlayer (SUL) properties.

FIGS. 6A-C illustrate calculations, based on a Micro-magnetic Model, of areal density capacity (ADC) as a function of various SUL properties, such as total thickness (FIG. 6A), saturation magnetic flux density ($B_s$) (FIG. 6B) and saturation field ($H_s$) (FIG. 6C). At nominal conditions, e.g., total SUL thickness=30 nm, $H_s$(SUL)=700 Oe, and $B_s$(SUL)=0.7 Tesla, FIGS. 6A-6C show that by changing one of these three parameters at a time, there is an optimal SUL thickness, $H_s$ and a possible $B_s$ at which the ADC may be maximized. However, for a conventional SUL structure, it is impossible to control the three parameters separately. This can only can be achieved using the novel SUL structures described herein.

It is known that the presence of a soft magnetic underlayer in PMR media is a source of noise. For example, the magnetization in the soft magnetic underlayer may cause a concentration of charge therein, which may interact with the recording bits and/or respond to stray fields in the recording head. Additionally, SUL-generated noise may arise from the formation and motion of magnetic domains in the soft magnetic underlayer. Increasing the thickness of the SUL, e.g., by using a single thick SUL or multiple thick SULs, to increase the saturation magnetization thereof may also increase SUL-generated noise, thereby degrading the signal to noise ratio. Moreover, increasing the thickness of the SUL may also increase the surface roughness thereof, which may be problematic for the low flying heights associated with a high areal density read/write head.

Figure 7:
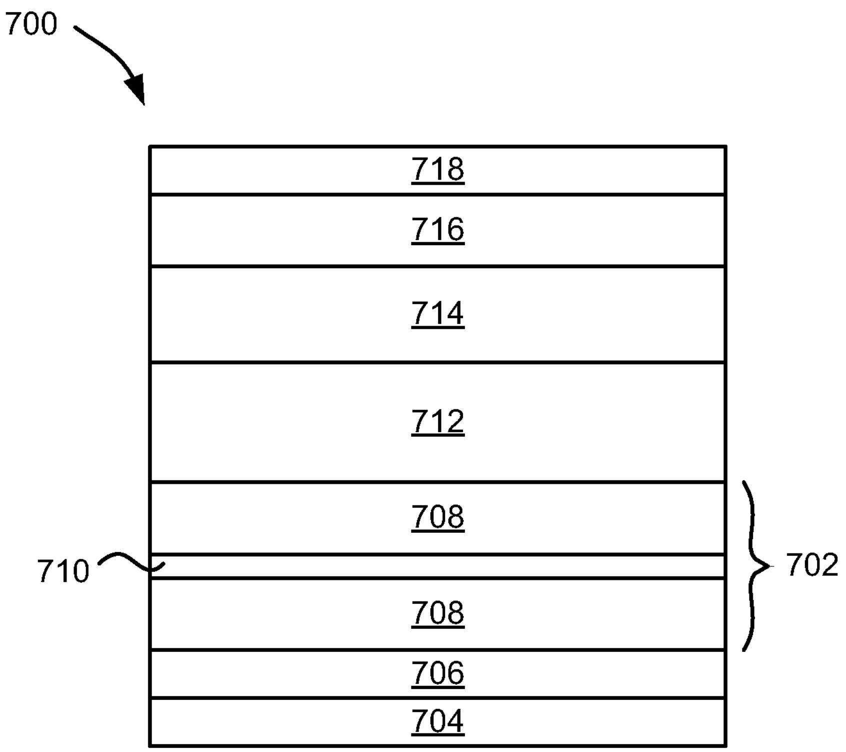
FIG. 7 is a schematic representation of a magnetic medium including a conventional multilayer SUL structure, according to one embodiment.

FIG. 7 provides one illustration of a perpendicular magnetic medium 700 including a conventional soft underlayer structure 702, according to one embodiment. As shown in FIG. 7, the perpendicular magnetic medium 700 includes a substrate 704 and an optional adhesion layer 706 deposited directly thereon. The conventional soft underlayer structure 702, which is positioned above the substrate 704, has two single SUL layers 708 sandwiching an intermediate layer 710. The perpendicular magnetic medium additionally includes an exchange break layer 712 deposited above the conventional soft underlayer structure 702, a magnetic recording layer 714 deposited above the exchange break layer 712, and a capping layer 716 and/or a protective overcoat layer 718 deposited above the magnetic recording layer 714.

For the perpendicular magnetic medium 700, achieving a high areal density requires both a narrow magnetic core width to create a high track density, and a high signal to noise ratio to enable reading high linear density. Reducing/narrowing the magnetic core width of the perpendicular magnetic medium 700 may be realized by various methods, including: increasing the coercivity, $H_c$, of the magnetic recording layer 714; reducing the thickness of the conventional SUL structure 702, particularly the thicknesses of the SUL layers 708; increasing the thickness of the exchange break layer 712, etc. However, these methods also lead to the unwanted degradation of the signal to noise ratio. Increasing track density to a greater extent than one would decrease linear density is generally a favorable tradeoff to increase areal density because SNR is more sensitive to linear density changes as compared to track density changes.

Embodiments disclosed herein provide novel multilayer SUL structures configured to achieve a higher SNR performance while maintaining MCW and/or a narrower MCW while maintaining SNR. Accordingly, as a higher SNR performance is not achieved at the expense of the MCW, and vice versa, the novel multilayer SUL structures described herein may be particularly suitable for high areal density perpendicular magnetic recording media.

Figure 8:
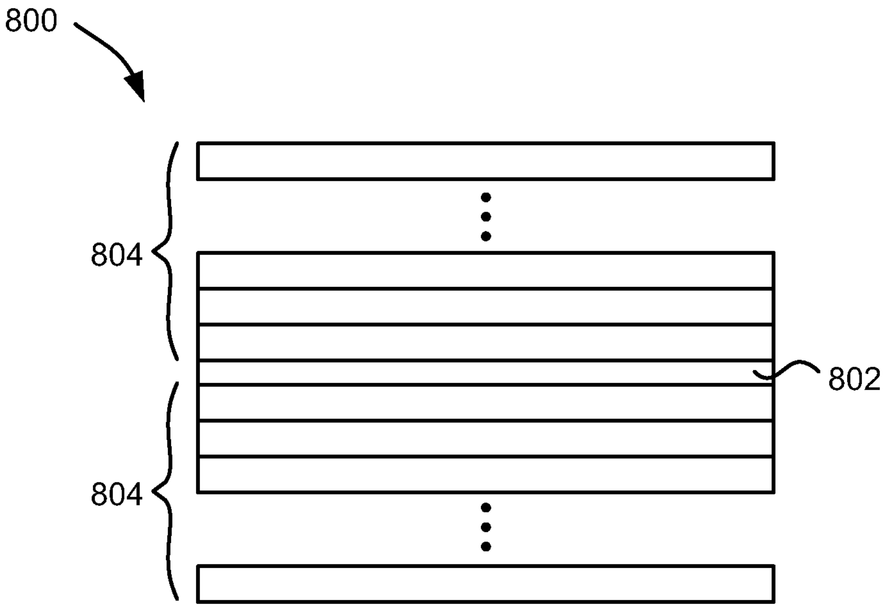
FIG. 8 is a schematic representation of a multilayer SUL structure, according to one embodiment.

FIG. 8 illustrates such a multilayer SUL structure 800, in accordance with one embodiment. As an option, the multilayer SUL structure 800 may be implemented in conjunction with features from any other embodiment listed herein, such as those described with reference to the other FIGS. Of course, the multilayer SUL structure 800 and others presented herein may be used in various applications and/or in permutations, which may or may not be specifically described in the illustrative embodiments listed herein. In preferred approaches, the multilayer SUL structure 800 may particularly suited for use in PMR media.

As shown in FIG. 8, the multilayer soft underlayer structure 800 includes a coupling layer 802. The coupling layer 802 may include Ru or other suitable material as would be understood by one having skill in the art upon reading the present disclosure.

As also shown in FIG. 8, an n number of SULs 804 are positioned above and below the coupling layer 802. In one approach, n may be equal to 2, such that there is one outer soft underlayer positioned above and below the coupling layer 802, and one inner soft underlayer positioned above and below the coupling layer 802 between the coupling layer 802 and the respective outer soft underlayer. However, in other approaches, n may be higher than 2, e.g. n may be 3, 4, 5, 6, 7, 8, 9, 10, etc. In preferred approaches, n may be in a range between 2 and 10. In more approaches, the number of SULs positioned above the coupling layer 802 may be the same or different from the number of SULs positioned below the coupling layer 802.

In various approaches, one, some, or all of the SULs positioned above the coupling layer 802 may have different saturation magnetic flux densities ($B_s$), compositions, and/or thicknesses from one another. Similarly, in more approaches, one, some, or all of the SULs positioned below the coupling layer 802 may have different saturation magnetic flux densities ($B_s$), compositions, and/or thicknesses from one another. For example, for the n number of SULs positioned above and/or below the coupling layer 802, there may be a decreasing gradient in saturation magnetic flux density ($B_s$) ranging from the innermost SUL to the outermost SUL according to one particular approach. In addition, for the n number of SULs positioned above and/or below the coupling layer 802, there may be an increasing gradient in the thickness ranging from the innermost SUL to the outermost SUL according to another particular approach.

In other approaches, the n number of SULs positioned above the coupling layer 802 may have a combined thickness in a range between about 120 Å to about 225 Å. Likewise, the n number of SULs positioned above the coupling layer 802 may have a combined thickness in a range between about 120 Å to about 225 Å, in yet other approaches. In further approaches, the combined thickness of the SULs positioned above the coupling layer 802 may be the same or different from the combined thickness of the SULs positioned below the coupling layer 802.

Figure 9:
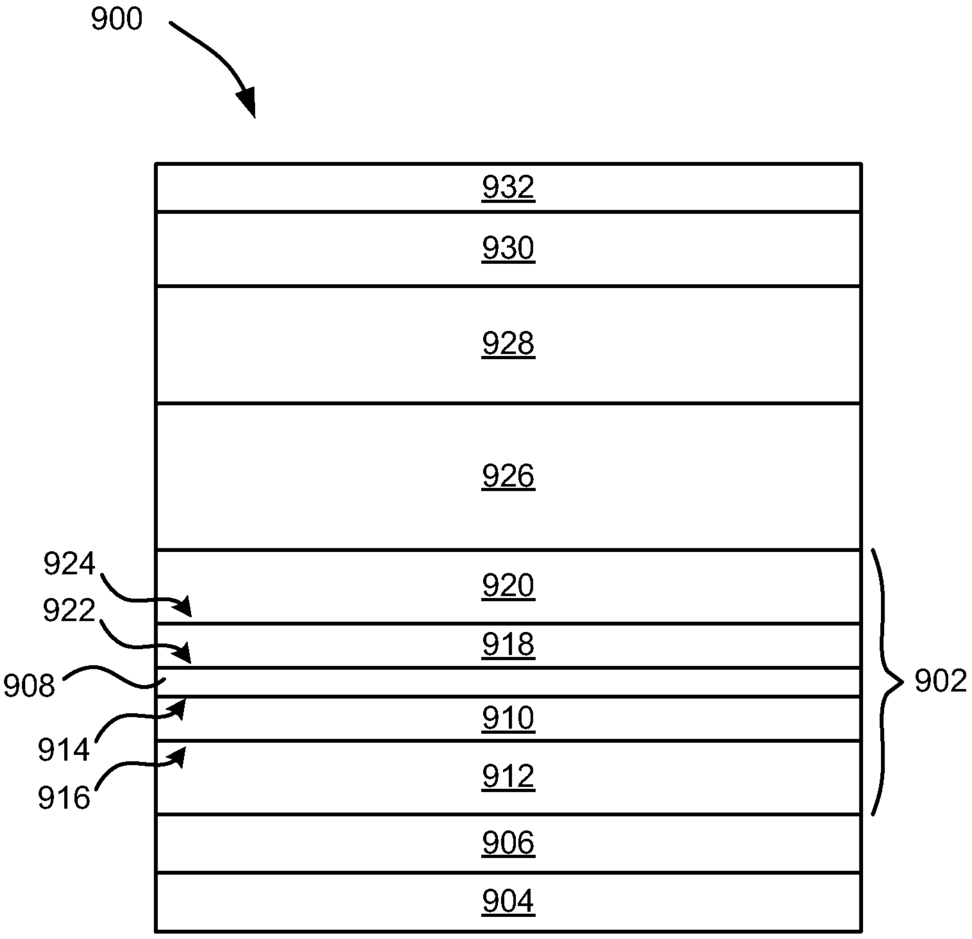
FIG. 9 is a schematic representation of a perpendicular magnetic recording (PMR) medium including a multilayer SUL structure, according to one embodiment.

Now referring to FIG. 9, a perpendicular magnetic recording (PMR) medium 900 including a multilayer SUL structure 902 is shown, according to one embodiment. As an option, the PMR medium 900 may be implemented in conjunction with features from any other embodiment listed herein, such as those described with reference to the other FIGS. Of course, the PMR medium 900 and others presented herein may be used in various applications and/or in permutations, which may or may not be specifically described in the illustrative embodiments listed herein. Further, the PMR medium 900 presented herein may be used in any desired environment, such as a disk-based storage system, a tape based storage system etc.

As shown in FIG. 9, the PMR medium 900 comprises a non-magnetic substrate 904, which may include glass, ceramic materials, glass/ceramic mixtures, AlMg, silicon, silicon-carbide, or other suitable substrate material as would be recognized by one having skill in the art upon reading the present disclosure. In one optional approach, the PMR medium 900 may include an adhesion layer 906 above the substrate 904 to promote coupling of layers formed thereabove.

As also shown in FIG. 9, the multilayer SUL structure 902 is positioned above the substrate 904 and the optional adhesion layer 906 if present. In various approaches, the SUL structure 902 may have any configuration as described herein with reference to structure 800 of FIG. 8. The exemplary variant of the multilayer soft underlayer structure 902 shown in FIG. 9 includes a coupling layer 908. The coupling layer 908 may include Ru or other suitable material as would be understood by one having skill in the art upon reading the present disclosure. The coupling layer 908 is intended to induce an anti-ferromagnetic coupling between the adjacent layers 910, 918 in some approaches. In preferred approaches, the thickness of the coupling layer 908 may be between about 0.2 nm to about 3 nm.

The multilayer soft underlayer structure 902 also includes a first inner SUL 910 and a first outer SUL 912 positioned below the coupling layer 908, where the first inner SUL 910 is located between the coupling layer 908 and the first outer SUL 912. In preferred approaches, the first inner SUL 910 may be positioned directly on the lower surface 914 of the coupling layer 908, and/or the first outer SUL 912 may be positioned directly on the lower surface 916 of the first inner SUL 910. In various approaches, the first inner SUL 910 may have a saturation magnetic flux density ($B_s$) and/or a thickness that is different than the saturation magnetic flux density ($B_s$) and/or the thickness of the first outer SUL 912. For instance, in one particular approach, the first inner SUL 910 may have a larger saturation magnetic flux density ($B_s$) and/or a smaller thickness as compared to the first outer SUL 912.

The multilayer soft underlayer structure 902 further includes a second inner SUL 918 and a second outer SUL 920 positioned above the coupling layer 908, where the second inner SUL 918 is located between the coupling layer 908 and the second outer SUL 920. Again, in preferred approaches, the second inner SUL 918 may be positioned directly on the upper surface 922 of the coupling layer 908, and/or the second outer SUL 920 may be positioned directly on the upper surface 924 of the second inner SUL 918. Moreover, in various approaches, the second inner SUL 918 may have a saturation magnetic flux density ($B_s$) and/or a thickness that is different than the saturation magnetic flux density ($B_s$) and/or the thickness of the second outer SUL 920. For example, in one particular approach, the second inner SUL 918 may have a larger saturation magnetic flux density ($B_s$) and/or a smaller thickness as compared to the second outer SUL 920.

In various approaches, the first inner SUL 910 and/or the second inner SUL 918 may include a material selected from a group consisting of: Fe, FeNi, FeCo, a Fe-based alloy, a FeNi-based alloy, a FeCo-based alloy, and combinations thereof. In more approaches, the first inner SUL 910 and/or the second inner SUL 918 may each have a saturation magnetic flux density ($B_s$, magnetic moment per unit volume) in a range between about 1.0 to about 2.1 Tesla. In yet more approaches, the first inner SUL 910 and/or the second inner SUL 918 may each have a thickness in a range between about 0.5 Å to about 20 Å. In one specific approach, the first inner SUL 910 and the second inner SUL 918 may have the same composition, saturation magnetic flux density ($B_s$) and/or thickness. In another approach, the first inner SUL 910 and the second inner SUL 918 may have a different composition, saturation magnetic flux density ($B_s$) and/or thickness.

In some approaches, the first outer SUL 912 and/or the second outer SUL 920 may include a material selected from a group consisting of: Fe, FeNi, FeCo, a Fe-based alloy, a FeNi-based alloy, a FeCo-based alloy, and combinations thereof. In more approaches, the first outer SUL 912 and/or the second outer SUL 920 may each have a saturation magnetic flux density ($B_s$) in a range between about 0.3 to less than 2.0 Tesla. In yet more approaches, the first outer SUL 912 and/or the second outer SUL 920 may each have a thickness in range between about 120 Å to about 200 Å. In one approach, the first outer SUL 912 and the second outer SUL 920 may have the same composition, saturation magnetic flux density ($B_s$) and/or thickness. In another approach, the first outer SUL 912 and the second outer SUL 920 may have a different composition, saturation magnetic flux density ($B_s$) and/or thickness.

In further approaches, the first inner SUL 910 and the first outer SUL 912 may have a combined thickness in a range between about 120 Å to about 225 Å. Similarly, in additional approaches, the second inner SUL 918 and the second outer SUL 920 may have a combined thickness in a range between about 120 Å to about 225 Å. In more approaches, the combined thickness of the first inner SUL 910 and the first outer SUL 912 may be the same or different as the combined thickness of the second inner SUL 918 and the second outer SUL 920.

With continued reference to FIG. 9, the PMR medium 900 includes an exchange break layer 926 positioned above the multilayer SUL structure 902. The exchange break layer 926 may be configured to promote ordered growth of the magnetic recording layer 928 positioned thereabove. In various approaches, the exchange break layer 926 may include at least one of: Ru; Ti; Re; Ru; Os; Cr; alloys of Ru, Ti, Re, Ru, Os, and Cr, or other such suitable material as would be understood by one having skill in the art upon reading the present disclosure. In an optional approach, the exchange break layer 926 may be formed directly on a seed layer (not shown), which may include Ni, Cr, W, Ta, and alloys thereof.

The magnetic recording layer 928 positioned above the exchange break layer 926 may include a granular ferromagnetic material, e.g. a material including a plurality of ferromagnetic grains. This granular ferromagnetic material may include, but is not limited to, Cr, Fe, Ta, Ni, Mo, Pt, W, Cr, Ru, Ti, Si, O, V, Nb, Ge, B, Pd. In some approaches, the granular ferromagnetic material may also include alloys comprising at least two of Co, Pt, Cr, Nb, and Ta. In other approaches, the magnetic recording layer 928 may also be a multilayer film, for example with Co and Pd or Pt being alternately layered.

Individual ferromagnetic grains and/or magnetic islands (e.g. comprised of a plurality of the ferromagnetic grains) in the magnetic recording layer 928 may be separated by a non-magnetic material (e.g., a segregant). The segregant may include oxides and/or nitrides of Ta, W, Nb, V, Mo, B, Si, Co, Cr, Ti, Al, etc., or C or Cr or any suitable non-magnetic segregant material known in the art.

In particular approaches, the magnetic recording layer 928 may be a patterned magnetic recording layer. In patterned recording media, the ensemble of magnetic grains that form a bit are replaced with a single isolated magnetic region, or island, that may be purposefully placed in a location where the write transducer expects to find the bit in order to write information and where the readback transducer expects to detect the information stored thereto. To reduce the magnetic moment between the isolated magnetic regions or islands in order to form the pattern, magnetic material is destroyed, removed or its magnetic moment substantially reduced or eliminated, leaving nonmagnetic regions therebetween. There are two types of patterned magnetic recording media: discrete track media (DTM) and bit patterned media (BPM). For DTM, the isolated magnetic regions form concentric data tracks of magnetic material, where the data tracks are radially separated from one another by concentric grooves of non-magnetic material. In BPM, the isolated magnetic regions form individual bits or data islands which are isolated from one another by nonmagnetic material (e.g. a segregant). Each bit or data island in BPM includes a single magnetic domain, which may be comprised of a single magnetic grain or a few strongly coupled grains that switch magnetic states in concert as a single magnetic volume.

As further shown in FIG. 9, the PMR medium 900 may include one or more optional capping layers 930 above the magnetic recording layer 928. The one or more capping layers 930 may be configured to mediate the intergranular coupling of the magnetic grains present in the magnetic recording layer 928. The capping layer may include, for example, a Co-, CoCr-, CoPtCr-, and/or CoPtCrB-based alloy, or other material suitable for use in a capping layer as would be recognized by one having skill in the art upon reading the present disclosure. In some approaches, a first high magnetic anisotropy ($K_u$) capping layer including an oxide may be positioned above the magnetic recording layer 928, and a second low $K_u$ capping layer may be positioned above the first capping layer.

As additionally shown in FIG. 9, a protective overcoat layer 932 may positioned above the magnetic recording layer 928 and/or the one or more capping layer 930 if present. The protective overcoat layer 932 may be configured to protect the underlying layers from wear, corrosion, etc. This protective overcoat layer 932 may be made of, for example, diamond-like carbon, Si-nitride, BN or B4C, etc. or other such materials suitable for a protective overcoat as would be understood by one having skill in the art upon reading the present disclosure.

The formation of the PMR medium 900 may be achieved via known deposition and processing techniques. For instance, deposition of each of the layers present in the PMR medium 900 may be achieved via sputter deposition, ion beam deposition, chemical vapor deposition, evaporation processes, or other such techniques as would be understood by one having skill in the art upon reading the present disclosure

COMPARATIVE EXAMPLES

The following comparative examples illustrate the differences between a conventional SUL structure and various embodiments of the multilayer SUL structures described herein. It is important to note that these embodiments of the multilayer SUL structure are for illustrative purposes only and does not limit the invention in anyway.

Example 1

Figure 10:
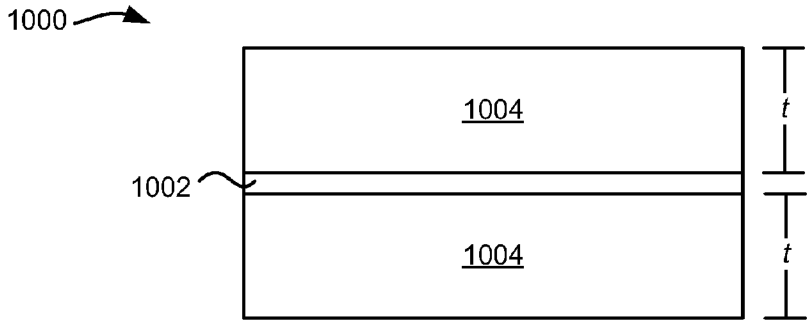
FIG. 10 is a schematic representation of a conventional SUL structure.

FIG. 10 provides a schematic diagram of the conventional SUL structure 1000. This conventional SUL structure 1000 includes a Ru coupling layer 1002 sandwiched between two soft magnetic underlayers 1004. The two soft underlayers 1004 are the same, each having a saturation magnetic flux density ($B_s$) of 0.7 Tesla and a thickness, t, of 160 Å.

Figure 11:
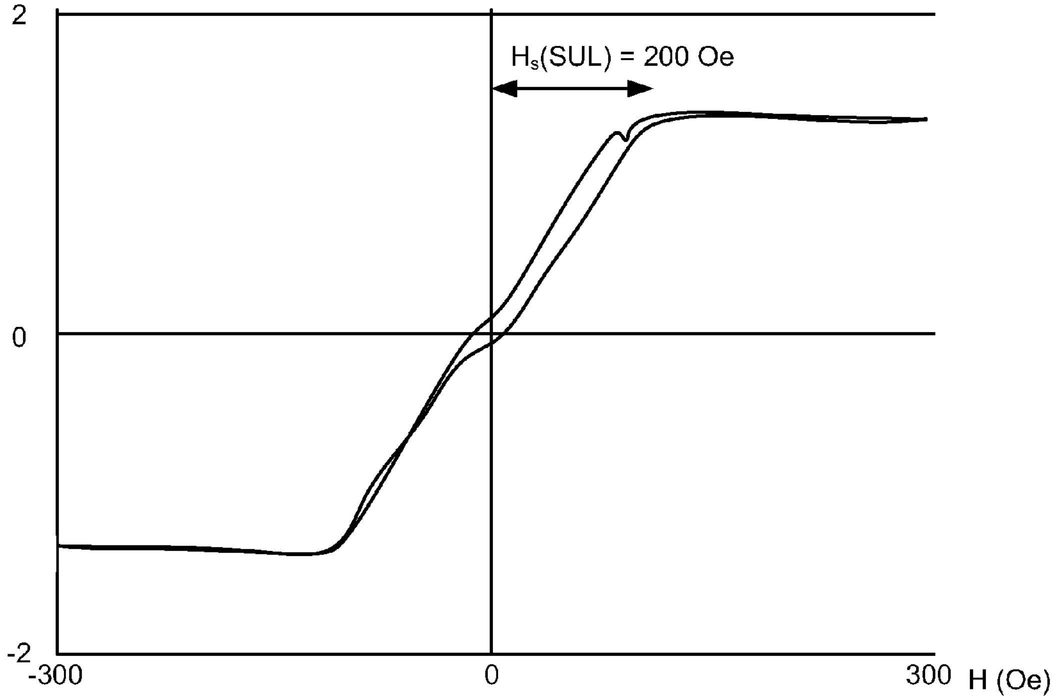
FIG. 11 is a plot of a hysteresis curve for the conventional SUL structure of FIG. 10.

FIG. 11 provides a hysteresis curve for the conventional SUL structure 1000 of FIG. 10. The vertical axis in FIG. 11 represents the magnetization in arbitrary units, and the horizontal axis represents an applied magnetic field in oerstedts. As shown in FIG. 11, the conventional SUL structure 1000 has a saturation field of 200 Oe, where the saturation field corresponds to the minimum magnetic field required to move the SUL magnetic moments from the easy axis to the hard axis.

Figure 12:
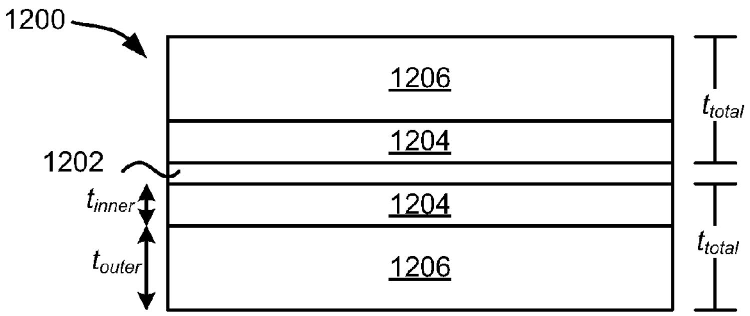
FIG. 12 is a schematic representation of a multilayer SUL structure, according to one embodiment.

FIG. 12 provides a schematic diagram of the multilayer SUL structure 1200, according to one particular embodiment. The multilayer SUL structure 1200 includes a Ru coupling layer 1202 sandwiched between two inner soft underlayers 1204. The multilayer SUL structure 1200 also includes two outer soft underlayers 1206, one of which is positioned above the coupling layer 1202, the other being positioned below the coupling layer 1202. The inner and outer soft underlayers 1204, 1206 positioned above the coupling layer 1202 have a combined thickness, $t_{total}$, of 160 Å. Likewise, the inner and outer soft underlayers 1204, 1206 positioned below the coupling layer 1202 have a combined thickness, $t_{total}$, of 160 Å. The two inner soft underlayers 1204 are the same, each having the same thickness, $t_{inner}$, and a saturation magnetic flux density ($B_s$) of 1.5 Tesla. Moreover, the two outer soft underlayers 1206 are the same, each having the same thickness, $t_{outer}$, and a saturation magnetic flux density ($B_s$) of 0.7 Tesla.

Figure 13:
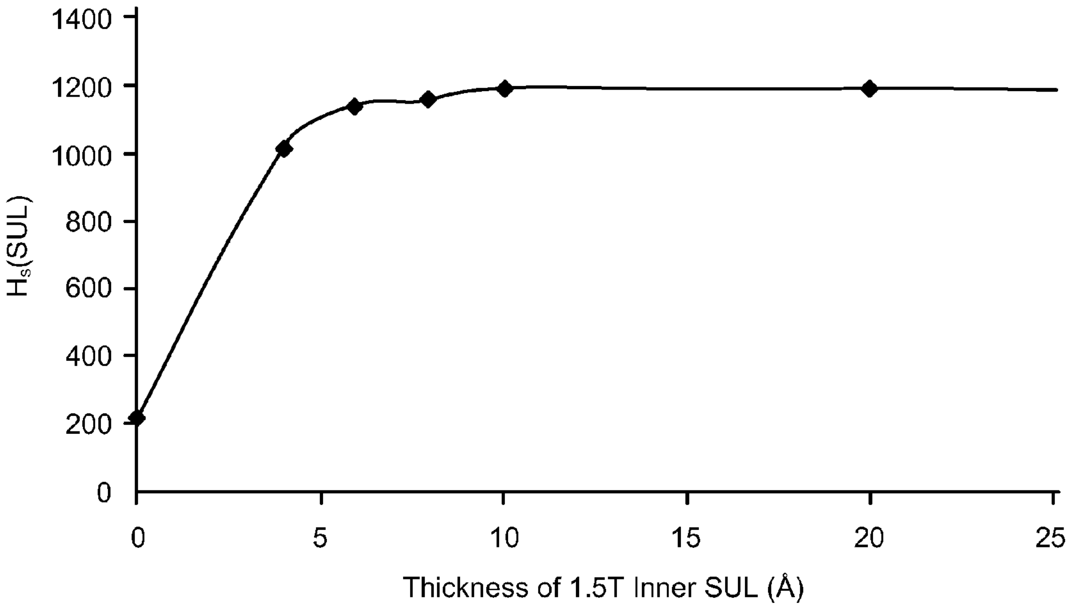
FIG. 13 is a plot of the saturation field, $H_s$(SUL) versus thickness of the inner soft underlayer for the SUL structure of FIG. 12.

FIG. 13 provides a plot of the saturation field, $H_s$(SUL), of the multilayer SUL structure 1200 (of FIG. 12) versus thickness ($t_{inner}$) of the inner SUL 1204. Regarding FIG. 13, it is important to note that while the thickness of the inner soft underlayers 1204 are varied, the thickness of the outer soft underlayers 1206 are also varied to ensure that the $t_{total}$ remains at 160 Å. As evident from FIG. 13, $H_s$(SUL) increases for increasing $t_{inner}$ up to about 12 Å and then remains substantially constant. It is apparent that inclusion of an inner soft underlayer with even a small thickness results in a greater $H_s$(SUL) as compared to that of the conventional SUL structure 1000 of FIG. 10.

Figure 14:
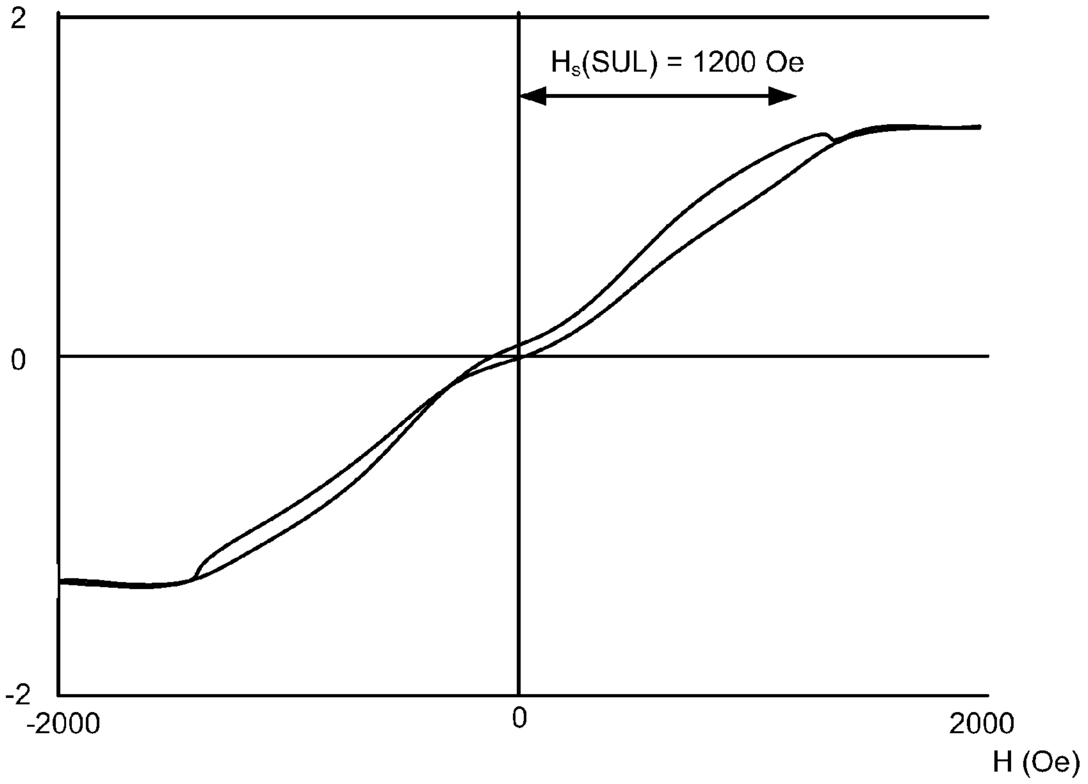
FIG. 14 is a plot a hysteresis curve for the SUL structure of FIG. 12.

FIG. 14 provides a hysteresis curve for the multilayer SUL structure 1200 of FIG. 12, where each of the inner soft underlayers 1204 have a thickness of about 12 Å and each of the outer soft underlayers 1206 have a thickness of about 148 Å. The vertical axis in FIG. 14 represents the magnetization in arbitrary units, and the horizontal axis represents an applied magnetic field in oerstedts.

Comparison of FIGS. 11-14, illustrate that the novel multilayer SUL structure 1200, which includes the inner soft magnetic layers 1204, has a larger saturation field than that of the conventional SUL structure 1000. Accordingly, use of the multilayer SUL structure 1200 in PMR media may improve the track density thereof as compared to use of a conventional SUL structure. Moreover, as discussed in detail below, it has been surprising found that use of the multilayer SUL structure 1200 in PMR media, while allowing for a narrower magnetic core width (and thus improved track density), does not degrade the signal to noise ratio as is expected for conventional SUL structures.

Example 2

Table 1 provides a comparison between magnetic media having two embodiments (SUL 1 and SUL2) of the novel multilayer SUL structures described herein as compared to an otherwise identical magnetic recording medium having the conventional SUL structure 1000 of FIG. 10. Both of the multilayer SUL structures (SUL 1 and SUL2) have the same general configuration as the multilayer SUL structure 1200 shown in FIG. 12.

TABLE 1

| | Conventional SUL | SUL1 | SUL2 |
|---|---|---|---|
| Outer SUL: thickness (Å)/$B_s$ (T) | 160/0.7 | 156/0.7 | 152/0.7 |
| Inner SUL: thickness (Å)/$B_s$ (T) | N/A | 4/1.5 | 8/1.5 |
| $H_s$(SUL) | 200 | 1000 | 1100 |
| Magnetic coercivity, $H_c$, of magnetic recording layer (MRL) | 5119 | 5095 | 5101 |
| Nucleation field, $H_n$ | −1839 | −1841 | −1832 |
| Switching field distribution (SFD) | 3139 | 3118 | 3122 |
| $H_s$(MRL) | 8318 | 8269 | 8281 |
| Overwrite, OW | 28.2 | 25.9 | 24.8 |
| Track field amplitude (TAA) of high frequency (HF) signal | 2.9 | 2.9 | 2.8 |
| TAA of low frequency (LF) signal | 10.1 | 9.9 | 9.8 |
| MCW (nm) | 67.2 | 65.2 | 61.4 |
| SNR 2T | 19.0 | 19.0 | 19.1 |
| SNR 1T | 9.5 | 9.5 | 9.5 |

As shown in Table 1, inclusion of the inner soft underlayers in SUL1 and SUL2 results in a narrower MCW as compared to the conventional SUL structure, which includes only a single outer soft underlayer on either side of the Ru coupling layer. Moreover, comparing SUL1 and SUL2 further reveals that increasing the thickness of the inner soft underlayers results in a further decrease in the MCW of the media. It is of particular note that while an increased thickness of the inner soft underlayers decreases MCW, the signal to noise ratio remains constant, as evidenced by the constant values for the signal to noise at the highest recording frequency (i.e. SNR 1T) and at half of the highest recording frequency (i.e. SNR 2T). This unpredictable and surprising result is contrary to what a skilled artisan would expect, namely that a narrower MCW (which enables an increase in track density) should lead to a reduction in the SNR (and thus a decrease in readable linear density.

Example 3

Table 2 provides a comparison between a magnetic medium including SUL1 as compared to an otherwise identical magnetic recording medium having the conventional SUL structure 1000 of FIG. 10. Table 2 additionally describes a magnetic medium including SUL1 and a magnetic recording layer (MRL) with a lower coercivity, $H_c$.

TABLE 2

| | Conventional SUL | SUL1 | SUL1 with low $H_c$(MRL) |
|---|---|---|---|
| Outer SUL: thickness (Å)/$B_s$ (T) | 160/0.7 | 156/0.7 | 156/0.7 |
| Inner SUL: thickness (Å)/$B_s$ (T) | N/A | 4/1.5 | 4/1.5 |
| $H_c$(MRL) | 5138 | 5161 | 5093 |
| $H_n$ | −1918 | −1947 | −1970 |
| SFD | 3101 | 3097 | 3015 |
| $H_s$(MRL) | 8300 | 8341 | 8160 |
| OW | 32.7 | 29.6 | 30.6 |
| TAA HF | 9.8 | 9.6 | 9.5 |
| TAA LF | 26.8 | 26.5 | 26.4 |
| MCW (nm) | 67.1 | 65.7 | 67.4 |
| SNR 2T | 17.2 | 17.3 | 17.6 |
| SNR 1T | 6.7 | 6.7 | 7.1 |

Comparison between the conventional SUL and SUL1 reveals that mere inclusion of the 4 Å inner soft underlayer narrows the MCW without degrading the SNR. Table 2 also reveals that use of SUL1 with a lower coercivity magnetic recording layer results in a larger SNR while maintaining substantially the same MCW. Again this was found to be a surprising and unpredictable result given that a skilled artisan would expect the SNR to increase at the expense of the MCW.

The above comparative examples illustrate that inclusion of the novel multilayer SUL structures described herein into magnetic media, particular PMR media, may lead to an improved SNR without decreasing MCW, and/or a narrower MCW without degrading SNR.

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A soft underlayer structure, comprising:

a coupling layer, at least one outer soft underlayer positioned above and below the coupling layer, and at least one inner soft underlayer positioned above and below the coupling layer between the coupling layer and the associated outer soft underlayer, wherein the inner soft underlayers have a saturation magnetic flux density and/or a thickness that is different than a saturation magnetic flux density and/or a thickness of the outer soft underlayers, wherein the saturation magnetic flux density of each of the inner soft underlayers is about 1.5 Tesla, wherein the saturation magnetic flux density of each of the outer soft underlayers is about 0.7 Tesla.

2. The soft underlayer structure as recited in claim 1, wherein the coupling layer comprises at least one of Ru and a Ru-based alloy.

3. The soft underlayer structure as recited in claim 1, wherein the inner soft underlayer and the outer soft underlayer positioned above the coupling layer have a combined thickness in a range between about 120 Å to about 225 Å, and wherein the inner soft underlayer and the outer soft underlayer positioned below the coupling layer have a combined thickness in a range between about 120 Å to about 225 Å.

4. The soft underlayer structure as recited in claim 1, wherein the thickness of each of the inner soft underlayers is in a range between about 1 Å to about 20 Å, wherein the thickness of each of the outer soft underlayers is in a range between about 120 Å to about 180 Å.

5. The soft underlayer structure as recited in claim 1, wherein the thickness of each of the inner soft underlayers is in a range from about 4 to 8 Å, wherein the thickness of each of the outer soft underlayers is in a range from about 120 Å to about 180 Å.

6. The soft underlayer structure as recited in claim 1, wherein each of the inner soft underlayers and/or each of the outer soft underlayers comprises a material selected from a group consisting of: Fe, FeNi, FeCo, a Fe-based alloy, a FeNi-based alloy, a FeCo-based alloy, and combinations thereof.

7. A product, comprising:

a soft underlayer structure, comprising:

a coupling layer, at least one outer soft underlayer positioned above and below the coupling layer, and at least one inner soft underlayer positioned above and below the coupling layer between the coupling layer and the associated outer soft underlayer, wherein the inner soft underlayers have a saturation magnetic flux density and/or a thickness that is different than a saturation magnetic flux density and/or a thickness of the outer soft underlayers;

at least one recording layer above the soft underlayer structure, the recording layer comprising a plurality of magnetic grains and a segregant material disposed between the magnetic grains;

a capping layer structure above the recording layer; and a protective overcoat above the capping layer structure; the capping layer structure comprises a first capping layer including an oxide, and a second capping layer above the first capping layer, wherein the first capping layer has a higher magnetic anisotropy than the second capping layer.

8. The product as recited in claim 7, wherein the thickness of each of the inner soft underlayers is in a range between about 1 Å to about 20 Å, wherein the thickness of each of the outer soft underlayers is in a range between about 120 Å to about 180 Å.

9. The product as recited in claim 7, where the saturation magnetic flux density of each of the inner soft underlayers is larger than the saturation magnetic flux density of each of the outer soft underlayers.

10. The product as recited in claim 7, wherein the saturation magnetic flux density of each of the inner soft underlayers is between about 1.0 T to about 2.1 Tesla.

11. The product as recited in claim 7, wherein the saturation magnetic flux density of each of the outer soft underlayers is between about 0.3 T to about 0.9 Tesla.

12. The product as recited in claim 7, wherein each of the inner soft underlayers and/or each of the outer soft underlayers comprises a material selected from a group consisting of: Fe, FeNi, FeCo, a Fe-based alloy, a FeNi-based alloy, a FeCo-based alloy, and combinations thereof.

13. The product as recited in claim 7, further comprising:

at least one magnetic head;

a magnetic medium having the soft underlayer structure;

a drive mechanism for passing the magnetic medium over the at least one magnetic head; and a controller electrically coupled to the at least one magnetic head for controlling operation of the at least one magnetic head.

14. The product as recited in claim 7, a combined thickness of the inner soft underlayer and the outer soft underlayer positioned above the coupling layer is in a range between about 120 Å to about 225 Å, and a combined thickness of the inner soft underlayer and the outer soft underlayer positioned below the coupling layer is in a range between about 120 Å to about 225 Å.

15. The product as recited in claim 14, wherein the combined thickness of the inner soft underlayer and the outer soft underlayer positioned above the coupling layer is different than the combined thickness of the inner soft underlayer and the outer soft underlayer positioned below the coupling layer.

16. A product, comprising:

a soft underlayer structure, comprising:

a coupling layer, an upper region above and on the coupling layer, the upper region comprising n number of upper soft underlayers, and a lower region below the coupling layer, the lower region comprising an m number of lower soft underlayers positioned below the coupling layer, wherein n and/or m are integers greater than 2, wherein the upper region comprises an increasing gradient in thickness and/or a decreasing gradient in magnetic saturation flux density from an innermost of the upper soft underlayers to an outermost of the upper soft underlayers, the innermost of the upper soft underlayers being positioned directly on the coupling layer, and wherein the lower region comprises an increasing gradient in thickness and/or a decreasing gradient in magnetic saturation flux density from an innermost of the lower soft underlayers to an outermost of the lower soft underlayers, the innermost of the lower soft underlayers being positioned directly on the coupling layer.

17. The product as recited in claim 16, wherein n and m are each independently integers greater than 2 and less than or equal to 10.

18. The product as recited in claim 17, wherein n and m have different integer values.

19. The product as recited in claim 16, comprising a recording layer above the soft underlayer structure, at least one capping layer above the recording layer, and a protective overcoat layer above the recording layer.

* * * * *

UNITED STATES PATENT AND TRADEMARK OFFICE

CERTIFICATE OF CORRECTION

PATENT NO. : 9,245,564 B2
APPLICATION NO. : 14/265161
DATED : January 26, 2016
INVENTOR(S) : Arnoldussen et al.

It is certified that error appears in the above-identified patent and that said Letters Patent is hereby corrected as shown below:

In the specification:

col. 10, line 60, replace “Cr,” with --Cr;--.

Signed and Sealed this
Twelfth Day of July, 2016

Michelle K. Lee
*Director of the United States Patent and Trademark Office*